US012359043B2

(12) United States Patent
Yagi et al.

(10) Patent No.: US 12,359,043 B2
(45) Date of Patent: *Jul. 15, 2025

(54) LIQUID-CRYSTAL POLYMER COMPOSITION, MOLDED LIQUID-CRYSTAL POLYMER, AND ELECTRICAL/ELECTRONIC APPLIANCE

(71) Applicant: OTSUKA CHEMICAL CO., LTD., Osaka (JP)

(72) Inventors: Hiroshi Yagi, Tokushima (JP); Hiroyuki Monde, Tokushima (JP)

(73) Assignee: OTSUKA CHEMICAL CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/286,600

(22) PCT Filed: Mar. 30, 2022

(86) PCT No.: PCT/JP2022/016014
§ 371 (c)(1),
(2) Date: Oct. 12, 2023

(87) PCT Pub. No.: WO2022/220125
PCT Pub. Date: Oct. 20, 2022

(65) Prior Publication Data
US 2024/0141143 A1 May 2, 2024

(30) Foreign Application Priority Data
Apr. 15, 2021 (JP) ................. 2021-069008

(51) Int. Cl.
G02F 1/1333 (2006.01)
C08K 13/06 (2006.01)
C08L 101/00 (2006.01)
G03B 17/02 (2021.01)
C08K 3/04 (2006.01)
C08K 3/30 (2006.01)
C08K 7/10 (2006.01)
C08K 9/06 (2006.01)

(52) U.S. Cl.
CPC ............ C08K 13/06 (2013.01); C08L 101/00 (2013.01); G03B 17/02 (2013.01); C08K 3/04 (2013.01); C08K 2003/3045 (2013.01); C08K 7/10 (2013.01); C08K 9/06 (2013.01); C08K 2201/004 (2013.01); C08K 2201/014 (2013.01); C08L 2205/12 (2013.01)

(58) Field of Classification Search
CPC ........ C09K 2019/521; C09K 2019/523; C09K 19/38; C09K 19/52; C09K 19/3809; G02F 1/1333
See application file for complete search history.

(56) References Cited

U.S. PATENT DOCUMENTS

| | | |
|---|---|---|
| 2009/0052025 A1 | 2/2009 | Kitano et al. |
| 2009/0283401 A1 | 11/2009 | Zang et al. |
| 2009/0290208 A1 | 11/2009 | Murata et al. |
| 2011/0089371 A1 | 4/2011 | Murouchi et al. |
| 2011/0114883 A1 | 5/2011 | Murouchi et al. |
| 2014/0011011 A1 | 1/2014 | Fujino et al. |
| 2015/0291796 A1 | 10/2015 | Kim |
| 2016/0161804 A1 | 6/2016 | Zhang et al. |
| 2018/0086914 A1 | 3/2018 | Kim |
| 2019/0031838 A1 | 1/2019 | Suzuki et al. |
| 2020/0123420 A1 | 4/2020 | Morioka et al. |
| 2020/0247996 A1 | 8/2020 | Kim |
| 2020/0362099 A1 | 11/2020 | Hara et al. |
| 2022/0098410 A1 | 3/2022 | Kim |
| 2022/0380675 A1 | 12/2022 | Maruo et al. |
| 2023/0383188 A1* | 11/2023 | Yagi ................. C08K 7/10 |
| 2024/0141143 A1* | 5/2024 | Yagi ................. C08L 101/00 |

FOREIGN PATENT DOCUMENTS

| | | |
|---|---|---|
| CN | 101080665 A | 11/2007 |
| CN | 101981123 A | 2/2011 |
| CN | 101981124 A | 2/2011 |
| CN | 103429660 A | 12/2013 |
| CN | 107924039 A | 4/2018 |
| CN | 111073551 A | 4/2020 |
| EP | 2774952 A1 | 9/2014 |
| JP | H4-323262 A | 11/1992 |
| JP | H10-206861 A | 8/1998 |
| JP | 2000-292615 A | 10/2000 |
| JP | 2003-213140 A | 7/2003 |
| JP | 2005-239754 A | 9/2005 |
| JP | 2008-120978 A | 5/2008 |
| JP | 2008-214573 A | 9/2008 |
| JP | 2009-276587 A | 11/2009 |

(Continued)

OTHER PUBLICATIONS

"Subject to." Merriam-Webster.com Dictionary, Merriam-Webster, https://www.merriam-webster.com/dictionary/subject%20to. Accessed Jan. 26, 2025. (Year: 2025).*

(Continued)

Primary Examiner — Geraldina Visconti
(74) Attorney, Agent, or Firm — WHDA, LLP

(57) ABSTRACT

Provided are: a liquid-crystal polymer composition capable of suppressing the production of particles when used as a member for a camera module and capable of reducing the kinetic coefficient of friction and the static coefficient of friction of the member; a molded liquid-crystal polymer body using the liquid-crystal polymer composition; and an electrical/electronic appliance with the molded liquid-crystal polymer body. The liquid-crystal polymer composition contains a liquid-crystal polymer (A), a fluorine-contained resin (B), and a reinforcing material (C), wherein a surface of the reinforcing material (C) is at least partly covered with a treated layer made of a hydrophobic surface treatment agent.

16 Claims, No Drawings

(56) References Cited

FOREIGN PATENT DOCUMENTS

| | | |
|---|---|---|
| JP | 2017-513976 A | 6/2017 |
| JP | 2020-045501 A | 3/2020 |
| JP | 2020-186346 A | 11/2020 |
| TW | 200643602 A | 12/2006 |
| TW | 200728415 A | 8/2007 |
| WO | 2013/066003 A1 | 5/2013 |
| WO | 2017/131018 A1 | 8/2017 |
| WO | 2019208381 A1 | 10/2019 |
| WO | 2020/241607 A1 | 12/2020 |
| WO | 2021/117607 A1 | 6/2021 |

OTHER PUBLICATIONS

International Search Report dated Jun. 28, 2022, issued in counterpart Application No. PCT/JP2022/016014. (3 pages).

Written Opinion of the International Searching Authority (Form PCT/ISA/237) dated Jun. 28, 2022, issued in counterpart International Application No. PCT/JP2022/016014. (4 pages).

Notification of Transmittal of Translation of the International Preliminary Report on Patentability (Form PCT/IB/338) issued in counterpart International Application No. PCT/JP2022/016014 mailed Oct. 26, 2023 with Forms PCT/IB/373 and PCT/ISA/237. (6 pages).

International Search Report dated Dec. 14, 2021, issued in counterpart International Application No. PCT/JP2021/039272. (3 pages).

Notification of Transmittal of Translation of the International Preliminary Report on Patentability (Form PCT/IB/338) issued in counterpart International Application No. PCT/JP2021/039272 mailed May 11, 2023 with Forms PCT/IB/373 and PCT/ISA/237. (5 pages).

Wang et al., "Studies on conductive plastics of reinforced unsaturated polyester", Journal of Ningxia Institute of Technology (Natural Science), 1997, No. 4, vol. 12, pp. 49-51, cited in Mar. 14, 2024. (3 pages).

Office Action dated Mar. 14, 2024, issued in counterpart CN application No. 202180072488.7, with English translation. (14 pages).

Non-Final Office Action dated Jul. 16, 2024, issued in U.S. Appl. No. 18/031,706 (21 pages).

Final Office Action dated Jan. 22, 2025, issued in U.S. Appl. No. 18/031,706. (19 pages).

"Subject to.", Merriam-Webster.com Dictionary, Merriam-Webster, https://www.merriam-webster.com/dictionary/subject%2oto. Accessed Jan. 16. 2025; Cited in Office Action dated Jan. 22, 2025, issued in U.S. Appl. No. 18/031,706. (1 page).

* cited by examiner

LIQUID-CRYSTAL POLYMER COMPOSITION, MOLDED LIQUID-CRYSTAL POLYMER, AND ELECTRICAL/ELECTRONIC APPLIANCE

TECHNICAL FIELD

The present invention relates to liquid-crystal polymer compositions, molded liquid-crystal polymer bodies using the liquid-crystal polymer compositions, and electrical/electronic appliances using the molded liquid-crystal polymer bodies.

BACKGROUND ART

Liquid-crystal polymers are used in various components because they are excellent in mechanical strength, moldability, dimensional accuracy, chemical resistance, moisture resistance, electrical properties, and so on. Particularly, because the liquid-crystal polymers have excellent thermal resistance and thin-wall moldability, use thereof in electronic components of precision equipment and the like is under consideration and, for example, use in a camera module is under consideration.

If any tiny speck of dirt, dust or like foreign matter adheres to a lens or an image sensor in a camera module, the camera module decreases its optical properties. For the purpose of preventing this decrease in optical properties, generally, members for the camera module are ultrasonically cleaned prior to the assembly of them to remove tiny specks of dirt, dust or like foreign matter adhering to the surfaces of the members. However, because liquid-crystal polymers have high crystalline orientation, it is known that a molded body made of liquid-crystal polymer (a molded liquid-crystal polymer body) is likely to cause surface delamination and the molded body when subjected to ultrasonic cleaning causes a phenomenon of surface delamination and napping (fibrillation). Furthermore, fibrillated portions of the molded liquid-crystal polymer body are likely to produce small powder (particles), which decreases the productivity. In addition, because of the susceptibility to fibrillation, the molded liquid-crystal polymer body has poor adhesiveness to other components of the camera module. To cope with these problems, Patent Literature 1 proposes a liquid-crystal polymer composition containing inorganic particles having a Mohs hardness of 2.5 or more.

CITATION LIST

Patent Literature

Patent Literature 1: JP-A-2017-513976

SUMMARY OF INVENTION

Technical Problem

Meanwhile, many models of smartphones incorporate a camera module and, particularly, camera modules with actuator mechanisms, including an autofocus (AF) mechanism and an optical image stabilizer (OIS) mechanism, are widely prevalent. In recent years, because of increasing number of cameras loaded into a single smartphone, novel actuator mechanisms, such as an integrated AF and OIS mechanism, toward enabling inexpensive production of camera modules have become widespread and size and thickness reduction in equipment and its components is correspondingly progressing.

Focusing on members for camera modules, a high number of pixels over a hundred million and a high-magnification optical zoom mechanism are loaded into a camera module, which results in technical attention to a weight increase in the entire camera module due to an increased number of lenses and an increased size of the lenses themselves, an increase in stress due to a novel structure adopted in the camera module, and so on and has caused problems never seen before. Recently, for electrical/electronic appliances with a camera function, such as a tablet terminal, a mobile phone, and a smartphone, a drop test has been conducted as a use endurance test, wherein a weight increase in the entire camera module and an increase in stress have caused an additional problem of an increased amount of particles produced by contact between components. The production of particles leads directly to failures in product performance, such as inclusion of the particles in camera pictures and effects on the operation of the camera module, and reduction in the amount of particles produced is therefore becoming a big challenge. Furthermore, in order to smoothly operate the actuator mechanisms as discussed above, molded liquid-crystal polymer bodies forming these mechanisms are required to be given a function to suppress the production of particles.

However, a molded body made of the liquid-crystal polymer composition in Patent Literature 1 cannot sufficiently be given a function to suppress the production of particles and additionally has a problem of failure to sufficiently reduce the kinetic coefficient of friction and the static coefficient of friction.

The present invention has been completed as a result of addressing the challenge of suppressing the production of particles in camera module members for use in AF mechanisms and OIS mechanisms, which is an increasing problem with increased frequency of carrying camera-equipped appliances.

Therefore, the present invention is aimed at solving the above problems and, specifically, has an object of providing a liquid-crystal polymer composition capable of suppressing the production of particles when used as a member for a camera module and capable of reducing the kinetic coefficient of friction and the static coefficient of friction of the member, a molded liquid-crystal polymer body using the liquid-crystal polymer composition, and an electrical/electronic appliance with the molded liquid-crystal polymer body.

Solution to Problem

The inventors conducted intensive studies to solve the above problems, thus found that a liquid-crystal polymer composition containing a liquid-crystal polymer (A), a fluorine-contained resin (B), a reinforcing material (C) a surface of which is at least partly covered with a treated layer made of a hydrophobic surface treatment agent, and further containing, as necessary, barium sulfate (D) and a particulate carbon material (E) can achieve the effect of suppressing the production of particles in a member for a camera module and also the effect of reducing the kinetic coefficient of friction and the static coefficient of friction of the member, and completed the present invention. Specifically, the gist of the present invention is as follows.

Aspect 1: A liquid-crystal polymer composition containing a liquid-crystal polymer (A), a fluorine-contained resin (B), and a reinforcing material (C), wherein a surface of the reinforcing material (C) is at least partly covered with a treated layer made of a hydrophobic surface treatment agent.

Aspect 2: The liquid-crystal polymer composition according to aspect 1, wherein the hydrophobic surface treatment agent is alkoxysilane represented by a general formula (I) below:

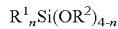    Formula (I)

$$R^1{}_n Si(OR^2)_{4-n}$$

wherein in the general formula (I) n represents an arbitrary integer selected from 1 to 3, $R^1$ represents an alkyl group, an alkenyl group or an aryl group, and $R^2$ represents an alkyl group.

Aspect 3: The liquid-crystal polymer composition according to aspect 1 or 2, wherein the fluorine-contained resin (B) has an average particle diameter of 0.1 μm to 100 μm.

Aspect 4: The liquid-crystal polymer composition according to any one of aspects 1 to 3, wherein a content of the fluorine-contained resin (B) is 0.1% by mass to 30% by mass in a total amount of 100% by mass of the liquid-crystal polymer composition.

Aspect 5: The liquid-crystal polymer composition according to any one of aspects 1 to 4, wherein a content of the reinforcing material (C) is 0.1% by mass to 40% by mass in a total amount of 100% by mass of the liquid-crystal polymer composition.

Aspect 6: The liquid-crystal polymer composition according to any one of aspects 1 to 5, wherein the reinforcing material (C) contains at least one of a fibrous reinforcing material (C1) and a platy reinforcing material (C2).

Aspect 7: The liquid-crystal polymer composition according to aspect 6, wherein the fibrous reinforcing material (C1) has an average fiber length of 1 μm to 300 μm.

Aspect 8: The liquid-crystal polymer composition according to aspect 6 or 7, wherein the fibrous reinforcing material (C1) has a Mohs hardness of not less than 2.5 and not more than 5.

Aspect 9: The liquid-crystal polymer composition according to any one of aspects 6 to 8, wherein the platy reinforcing material (C2) has a Mohs hardness of not less than 1 and less than 2.5.

Aspect 10: The liquid-crystal polymer composition according to any one of aspects 6 to 9, wherein a mass ratio of the platy reinforcing material (C2) to the fibrous reinforcing material (C1) (platy reinforcing material (C2)/fibrous reinforcing material (C1)) is 0 to 1.

Aspect 11: The liquid-crystal polymer composition according to any one of aspects 6 to 10, wherein the reinforcing material (C) contains both the fibrous reinforcing material (C1) and the platy reinforcing material (C2).

Aspect 12: The liquid-crystal polymer composition according to aspect 11, wherein respective surfaces of the fibrous reinforcing material (C1) and the platy reinforcing material (C2) are each at least partly covered with a treated layer made of a hydrophobic surface treatment agent.

Aspect 13: The liquid-crystal polymer composition according to any one of aspects 1 to 12, wherein the liquid-crystal polymer (A) is a wholly aromatic liquid-crystal polymer.

Aspect 14: The liquid-crystal polymer composition according to any one of aspects 1 to 13, being used in a camera module.

Aspect 15: A molded liquid-crystal polymer body being a molded body of the liquid-crystal polymer composition according to any one of aspects 1 to 14.

Aspect 16: The molded liquid-crystal polymer body according to aspect 15, being a member for a camera module.

Aspect 17: An electrical/electronic appliance having a camera function, the electrical/electronic appliance including the molded liquid-crystal polymer body according to aspect 15 or 16.

Advantageous Effects of Invention

The present invention enables provision of a liquid-crystal polymer composition capable of suppressing the production of particles when used as a member for a camera module and capable of reducing the kinetic coefficient of friction and the static coefficient of friction of the member, a molded liquid-crystal polymer body using the liquid-crystal polymer composition, and an electrical/electronic appliance with the molded liquid-crystal polymer body.

DESCRIPTION OF EMBODIMENTS

Hereinafter, a description will be given of examples of a preferred embodiment for working of the present invention. However, the following embodiment is simply illustrative. The present invention is not at all limited by the following embodiment.

Liquid-Crystal Polymer Composition

A liquid-crystal polymer composition according to the present invention contains a liquid-crystal polymer (A), a fluorine-contained resin (B), and a reinforcing material (C) the surface of which is at least partly covered with a treated layer made of a hydrophobic surface treatment agent, and may further contain, as necessary, barium sulfate (D), a particulate carbon material (E), a solid lubricant, and other additives.

Since the liquid-crystal polymer composition according to the present invention contains the above components, it can suppress the production of particles when used as a member for a camera module. Furthermore, in a molded liquid-crystal polymer body obtained by molding the liquid-crystal polymer composition according to the present invention, the kinetic coefficient of friction and the static coefficient of friction can be reduced.

A description will be given below of components and so on of the liquid-crystal polymer composition according to the present invention.

Liquid-Crystal Polymer (A)

The liquid-crystal polymer composition according to the present invention contains a liquid-crystal polymer (A) (hereinafter, referred to also as a "component (A)"). The liquid-crystal polymer (A) refers to a melt-processable polymer having a property capable of forming an optically anisotropic molten phase and is not particularly limited so long as it is what is termed a thermotropic liquid-crystal polymer in the art. The optically anisotropic molten phase can be confirmed by normal ellipsometry using an orthogonal polarizer.

The liquid-crystal polymer (A) has an elongated molecular shape and has a flat molecular chain having high rigidity along the long chain (wherein the molecular chain is referred to as a "mesogenic group"). The liquid-crystal polymer (A) may have a mesogenic group in one or both of a polymer main chain and a polymer side chain. However, when a resulting molded liquid-crystal polymer body requires higher thermal resistance, the preferred liquid-crystal polymer (A) is one in which the polymer main chain contains a mesogenic group.

Examples of the component (A) include liquid-crystal polyester, liquid-crystal polyester amide, liquid-crystal polyester ether, liquid-crystal polyester carbonate, liquid-crystal polyester imide, and liquid-crystal polyamide. Among these liquid-crystal polymers, liquid-crystal polyester, liquid-crystal polyester amide or liquid-crystal polyamide is preferred as the component (A) from the viewpoint of obtaining a molded liquid-crystal polymer body having higher strength. Alternatively, from the viewpoint of obtaining a lower water-absorption molded liquid-crystal polymer body, liquid-crystal polyester or liquid-crystal amide is preferred as the component (A) and liquid-crystal polyester is more preferred as the component (A).

More specifically, examples include liquid-crystal polymers (A1) to (A6) below and the component (A) is preferably a wholly aromatic liquid-crystal polymer obtained using only an aromatic compound as a raw material monomer. A liquid-crystal polymer selected from them may be used singly as the component (A) or a combination of two or more of them may be used as the component (A).

Examples include the following liquid-crystal polymers:
(A1) liquid-crystal polyester composed of repeating units represented by Formula (1);
(A2) liquid-crystal polyester composed of repeating units represented by Formula (2) and repeating units represented by Formula (3);
(A3) liquid-crystal polyester composed of repeating units represented by Formula (1), repeating units represented by Formula (2), and repeating units represented by Formula (3);
(A4) liquid-crystal polyester amide or liquid-crystal polyamide in which some or all of the repeating units represented by Formula (1) in (A1) are substituted with repeating units represented by Formula (4);
(A5) liquid-crystal polyester amide or liquid-crystal polyamide in which some or all of the repeating units represented by Formula (3) in (A2) are substituted with repeating units represented by Formula (5) and/or repeating units represented by Formula (6); and
(A6) liquid-crystal polyester amide in which some or all of the repeating units represented by Formula (3) in (A3) are substituted with repeating units represented by Formula (5) and/or repeating units represented by Formula (6).

A liquid-crystal polymer selected from these liquid-crystal polymers may be used singly or a combination of two or more of them may be used as the liquid-crystal polymer (A).

[Chem. 1]

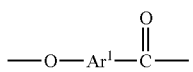

Formula (1)

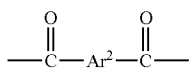

Formula (2)

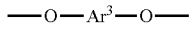

Formula (3)

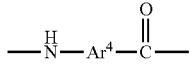

Formula (4)

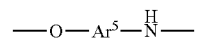

Formula (5)

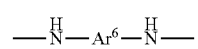

Formula (6)

In the formulae, $Ar^1$ and $Ar^4$ each independently represent a 1,4-phenylene group, a 2,6-naphthalenediyl group or a 4,4-biphenylene group, $Ar^2$, $Ar^3$, $Ar^5$, and $Ar^6$ each independently represent a 1,4-phenylene group, a 2,6-naphthalenediyl group, a 1,3-phenylene group or a 4,4-biphenylene group, and regarding $Ar^1$, $Ar^2$, $Ar^3$, $Ar^4$, $Ar^5$, and $Ar^6$, some or all of the hydrogen atoms on the aromatic ring may be substituted with halogen atoms, alkyl groups or aryl groups.

The repeating units represented by Formula (1) are repeating units derived from an aromatic hydroxycarboxylic acid. Examples of the aromatic hydroxycarboxylic acid include 4-hydroxybenzoic acid, 3-hydroxybenzoic acid, 6-hydroxy-2-naphthoic acid, 7-hydroxy-2-naphthoic acid, 6-hydroxy-1-naphthoic acid, 4-hydroxybiphenyl-4-carboxylic acid, and aromatic hydroxycarboxylic acids in which some or all of the hydrogens on the aromatic ring in each of the above aromatic hydroxycarboxylic acids are substituted with alkyl groups, aryl groups or halogen atoms.

The repeating units represented by Formula (2) are repeating units derived from an aromatic dicarboxylic acid. Examples of the aromatic dicarboxylic acid include terephthalic acid, phthalic acid, 2,4-diphenyldicarboxylic acid, 2,6-naphthalenedicarboxylic acid, isophthalic acid, and aromatic dicarboxylic acids in which some or all of the hydrogens on the aromatic ring in each of the above aromatic dicarboxylic acids are substituted with alkyl groups, aryl groups or halogen atoms.

The repeating units represented by Formula (3) are repeating units derived from an aromatic diol. Examples of the aromatic diol include hydroquinone, resorcin, naphthalene-2,6-diol, 4,4-biphenylenediol, 3,3-biphenylenediol, 4,4-dihydroxydiphenyl ether, 4,4-dihydroxydiphenyl sulfone, and aromatic diols in which some or all of the hydrogens on the aromatic ring in each of the above aromatic diols are substituted with alkyl groups, aryl groups or halogen atoms.

The repeating units represented by Formula (4) are repeating units derived from an aromatic aminocarboxylic acid. Examples of the aromatic aminocarboxylic acid include 4-aminobenzoic acid, 3-aminobenzoic acid, 6-amino-2-naphthoic acid, and aromatic aminocarboxylic acids in which some or all of the hydrogens on the aromatic ring in each of the above aromatic aminocarboxylic acids are substituted with alkyl groups, aryl groups or halogen atoms.

The repeating units represented by Formula (5) are repeating units derived from an aromatic amine having a hydroxy group. Examples of the aromatic amine having a hydroxy group include 4-aminophenol, 3-aminophenol, 4-amino-1-naphthol, 4-amino-4-hydroxydiphenyl, and aromatic hydroxyamines in which some or all of the hydrogens on the aromatic ring in each of the above aromatic amines with a hydroxy group are substituted with alkyl groups, aryl groups or halogen atoms.

The repeating units represented by Formula (6) are structural units derived from an aromatic diamine. Examples of the aromatic diamine include 1,4-phenylenediamine, 1,3-phenylenediamine, and aromatic diamines in which some or all of the hydrogens on the aromatic ring in each of the above aromatic diamines are substituted with alkyl groups, aryl groups or halogen atoms.

Examples of the alkyl group listed as an example of the substituents in the above structural units include linear, branched or alicyclic alkyl groups having 1 to 10 carbon atoms, including a methyl group, an ethyl group, a propyl group, an isopropyl group, a butyl group, a tert-butyl group, a hexyl group, a cyclohexyl group, an octyl group, and a decyl group. Examples of the aryl group include aryl groups having 6 to 10 carbon atoms, including a phenyl group and a naphthyl group. Examples of the halogen atom include a fluorine atom, a chlorine atom, a bromine atom, and an iodine atom.

Among the components (A), in view of providing a molded liquid-crystal polymer body having higher thermal resistance and higher dimensional stability, at least one liquid-crystal polyester selected from the group consisting of (A1) to (A3) is preferred and liquid-crystal polyester (A1) or (A3) is particularly preferred.

Preferred among the components (A) are liquid-crystal polymers in which the melt viscosity as measured at a temperature 20° C. to 40° C. higher than the melting point is $1.0 \times 10^3$ mPa·s to $1.0 \times 10^5$ mPa·s. For example, depending on the thermal deformation temperature, liquid-crystal polymers having a deflection temperature of 260° C. or higher under load are referred to as a type I and liquid-crystal polymers having a deflection temperature of not lower than 210° C. and lower than 260° C. under load are referred to as a type II. The liquid-crystal polymers of type I are measured at a temperature 30° C. higher than the melting point and the liquid-crystal polymers of type II are measured at a temperature 40° C. higher than the melting point. The melt viscosity can be acquired by using a capillary rheometer to measure the viscosity of a sample passing through an orifice with a diameter of 1 mm and a length of 10 mm at a shear rate of $1.0 \times 10^3$ sec$^{-1}$.

The form of the component (A) is not particularly limited so long as it can be melt-kneaded. For example, any one of powdered, granular, and pelletized forms can be used.

The content of the component (A) in the liquid-crystal polymer composition according to the present invention is, in a total amount of 100% by mass of the liquid-crystal polymer composition, preferably 40% by mass to 98% by mass, more preferably 60% by mass to 94% by mass, and still more preferably 70% by mass to 90% by mass.

Fluorine-Contained Resin (B)

The liquid-crystal polymer composition according to the present invention contains a fluorine-contained resin (B) (hereinafter, referred to also as a "component (B)"). The component (B) is a polymer having repeating units of —(CF$_2$—CF$_2$)— and, for example, a modified polytetrafluoroethylene resin into which a perfluoroalkyl ether group —(C$_p$F$_{2p}$—O)— (where p is an integer of 1 to 4) is introduced can be used.

The component (B) may be obtained using the suspension polymerization method for obtaining general molding powder or the emulsion polymerization method for obtaining fine powder. Alternatively, the component (B) may be a polytetrafluoroethylene resin converted from a high-molecular-weight polytetrafluoroethylene resin to a low-molecular-weight form by thermal decomposition or radiation.

The component (B) is preferably in powdered form and its average particle diameter is preferably 0.1 µm to 100 µm, more preferably 1 µm to 50 µm, and still more preferably 5 µm to 20 µm. By defining the average particle diameter within the above range, the coefficient of friction during sliding can be further reduced. The average particle diameter of the component (B) can be measured by the laser diffraction and scattering method and is a particle diameter at a volume-based cumulative integrated value of 50% in a particle size distribution measured by the laser diffraction and scattering method (a volume-based 50% cumulative particle diameter), i.e., D$_{50}$ (a median diameter). This volume-based 50% cumulative particle diameter (D$_{50}$) is a particle diameter at a cumulative value of 50% in a cumulative curve of a particle size distribution determined on a volume basis, the cumulative curve assuming the total volume of particles to be 100%, where during accumulation the number of particles is counted from a smaller size side.

The particle shape of the component (B) that can be used is not particularly limited so long as the component (B) is non-fibrous particles, such as spherical, prismoidal, platy, rodlike, columnar, blocky or amorphous particles. The particle shape of the component (B) can be analyzed, for example, by observation with a scanning electron microscope (SEM).

Fibrous particles as used in the present invention refer to particles having an L/B of 3 or more and an L/T of 3 or more where the dimension of the longest side of, among cuboids (circumscribing cuboids) circumscribing the particle, a cuboid having the minimum volume is defined as a length L, the dimension of the second longest side of the cuboid is defined as a breadth B, and the dimension of the shortest side of the cuboid is defined as a thickness T (i.e., B>T). The length L and the breadth B correspond to the fiber length and the fiber diameter, respectively. The fibrous particles preferably have an L/B of 5 or more and an L/T of 5 or more. The non-fibrous particles refer to particles having an L/B of less than 3 and those of non-fibrous particles having an L/B of less than 3 and an L/T of 3 or more are referred to as platy particles.

Polytetrafluoroethylene resin (hereinafter, referred to also as "PTFE") is classified as a thermoplastic resin, but generally has an abnormally high melt viscosity and therefore cannot be injection molded. For this reason, a molded body of a resin composition containing PTFE as a major ingredient is produced by a method of compressing a mixed powder of resins and heating it to a melting point or higher to fuse the powder particles together (compression molding). PTFE for use in compression molding is high-molecular-weight one. However, if high-molecular-weight PTFE is blended and melt mixed with a general thermoplastic resin, the resin composition becomes less flowable owing to fibrillation or agglomeration of PTFE and therefore can neither be melt mixed nor injection molded. For this reason, PTFE for use as a solid lubricant for an injection-molding thermoplastic resin is low-molecular-weight PTFE. Furthermore, the liquid-crystal polymer is generally melt mixed at a temperature around the melting point of PTFE and has a low viscosity during melting. Therefore, if the molecular weight of PTFE to be blended and melt mixed is too high, its particles may agglomerate.

The molecular weight and melt viscosity of PTFE are correlated with each other. Therefore, as for PTFE for use as the component (B), its MFR value measured under conditions at a temperature of 372° C. and a load of 5 kg is preferably 5 g/10 min or more, more preferably 10 g/10 min or more, and still more preferably more than 35 g/10 min. The MFR value of the component (B) can be measured in conformity with JIS K 7210.

PTFE may be fired in order to suppress fibrillation and agglomeration. The melting point of a fired body thereof is 320° C. to 330° C. and the melting point of an unfired body thereof is 330° C. to 350° C., although they slightly vary depending on the molecular weight. Therefore, the firing degree can be estimated by observing the melting point. From the viewpoint of further suppressing agglomeration during molding, the melting point of the component (B) is preferably lower than 330° C. and its lower limit is preferably 320° C. The melting point of PTFE can be measured in conformity with JIS-K 7121.

The content of the component (B) in the liquid-crystal polymer composition according to the present invention is, in a total amount of 100% by mass of the liquid-crystal polymer composition, preferably 0.1% by mass to 30% by mass, more preferably 1% by mass to 20% by mass, still more preferably 5% by mass to 18% by mass, and particularly preferably 7.5% by mass to 15% by mass. By defining the content of the component (B) within the range of 0.1% by mass to 30% by mass, the sliding properties can be further increased.

Reinforcing Material (C)

The liquid-crystal polymer composition according to the present invention contains a reinforcing material (C) (hereinafter, referred to also as a "component (C)"). The component (C) is a powdered reinforcing material formed of particles and the shape of the particles is not particularly limited so long as it can increase the strength and rigidity of the resin composition. Examples that can be used as the component (C) include: a fibrous reinforcing material (C1) (hereinafter, also referred to as a "component (C1)") which is powder formed of fibrous particles; and a platy reinforcing material (C2) (hereinafter, also referred to as a "component (C2)") which is powder formed of platy particles. Among them, at least one of the group consisting of the fibrous reinforcing material (C1) and the platy reinforcing material (C2) is preferred. The particle shape of the component (C) can be analyzed, for example, by observation with a scanning electron microscope (SEM).

The fibrous particles as used in the present invention refer to particles having an L/B of 3 or more and an L/T of 3 or more where the dimension of the longest side of, among cuboids (circumscribing cuboids) circumscribing the particle, a cuboid having the minimum volume is defined as a length L, the dimension of the second longest side of the cuboid is defined as a breadth B, and the dimension of the shortest side of the cuboid is defined as a thickness T (i.e., B>T). The length L and the breadth B correspond to the fiber length and the fiber diameter, respectively. The platy particles refer to particles having an L/B of less than 3 and an L/T of 3 or more.

Specific examples of the fibrous reinforcing material (C1) include: inorganic fibers, such as carbon fibers, glass fibers, potassium titanate fibers, wollastonite fibers, aluminum borate, magnesium borate, xonotlite, zinc oxide, basic magnesium sulfate, alumina fibers, silicon carbide fibers, and boron fibers; and organic fibers, such as aramid fibers and polyphenylene benzoxazole (PBO) fibers. The inorganic fibers are preferred. These types of fibrous reinforcing materials (C1) maybe used singly or in combination of two or more of them.

From the viewpoint of further reducing the production of particles, the fibrous reinforcing material (C1) is preferably particles having a Mohs hardness of not less than 2.5 and not more than 5 and more preferably at least one type of fibers of potassium titanate fibers and wollastonite fibers. The Mohs hardness is an index indicating the hardness of substances, wherein when two different minerals are rubbed against each other, scratched one of them is a substance having a lower hardness.

From the viewpoint of further reducing the production of particles, the average fiber length of the fibrous reinforcing material (C1) is preferably 1 µm to 300 µm, more preferably 1 µm to 200 µm, still more preferably 3 µm to 100 µm, and particularly preferably 5 µm to 50 µm. The average aspect ratio of the fibrous reinforcing material (C1) is preferably 3 to 200, more preferably 3 to 100, still more preferably 3 to 50, and particularly preferably 3 to 40.

Heretofore known potassium titanate fibers can be widely used as the potassium titanate fibers and examples include potassium tetratitanate fibers, potassium hexatitanate fibers, and potassium octatitanate fibers. The dimensions of the potassium titanate fibers are not particularly limited so long as they are in the above-described ranges of dimensions, but the average fiber length is preferably 1 µm to 50 µm, more preferably 3 µm to 30 µm, and still more preferably 3 µm to 20 µm. The average fiber diameter of the potassium titanate fibers is preferably 0.01 µm to 1 µm, more preferably 0.05 µm to 0.8 µm, and still more preferably 0.1 µm to 0.7 µm. The average aspect ratio of the potassium titanate fibers is preferably 10 or more, more preferably 10 to 100, and still more preferably 15 to 35. Even marketed products can be used for these fibrous reinforcing materials (C1) and examples that can be used include "TISMO D" (average fiber length: 15 µm, average fiber diameter: 0.5 µm) and "TISMO N" (average fiber length: 15 µm, average fiber diameter: 0.5 µm) both manufactured by Otsuka Chemical Co., Ltd.

Wollastonite fibers are inorganic fibers made of calcium metasilicate. The dimensions of the wollastonite fibers are not particularly limited so long as they are in the above-described ranges of dimensions of the fibrous reinforcing material (C1), but the average fiber length is preferably 5 µm to 180 µm, more preferably 7 µm to 100 µm, and still more preferably 9 µm to 40 µm. The average fiber diameter of the wollastonite fibers is preferably 0.1 µm to 15 µm, more preferably 1 µm to 10 µm, and still more preferably 2 µm to 7 µm. The average aspect ratio of the wollastonite fibers is preferably 3 or more, more preferably 3 to 30, and still more preferably 3 to 15. Even marketed products can be used for these fibrous reinforcing materials (C1) and an example that can be used is "Bistal W" (average fiber length: 25 µm, average fiber diameter: 3 µm) manufactured by Otsuka Chemical Co., Ltd.

The above average fiber length and average fiber diameter can be measured by observation with a scanning electron microscope (SEM), and the average aspect ratio ((average fiber length)/(average fiber diameter)) can be calculated from the average fiber length and the average fiber diameter. For example, a plurality of fibers of the fibrous reinforcing material are taken with a scanning electron microscope (SEM), the images of 300 fibers of the fibrous reinforcing material are arbitrarily selected from the observed images of the plurality of fibers, and their fiber lengths and fiber diameters are measured. Then, the average fiber length can be determined by dividing the sum of all the measured fiber lengths by the number of fibers, and the average fiber diameter can be determined by dividing the sum of all the measured fiber diameters by the number of fibers.

Specific examples of the platy reinforcing material (C2) include mica, sericite, illite, talc, kaolinite, montmorillonite, boehmite, smectite, vermiculite, titanium dioxide, potassium titanate, potassium lithium titanate, potassium magnesium titanate, and boehmite. These types of platy reinforcing materials (C2) may be used singly or in combination of two or more of them. The platy shape as used in the present invention include, in addition to platy shape, flaky shape and scaly shape.

From the viewpoint of further reducing the production of particles, the platy reinforcing material (C2) is preferably particles having a Mohs hardness of not less than 1 and less than 2.5 and is more preferably talc.

Talc is hydrated magnesium silicate in terms of chemical composition, is generally expressed by a chemical formula $4SiO_2 \cdot 3MgO \cdot 2H_2O$, and is normally in the form of flaky particles having a layered structure. Even marketed products can be used as these types of talc.

From the viewpoint of further reducing the production of particles, the average particle diameter of the platy reinforcing material (C2) is preferably 1 μm to 50 μm, more preferably 3 μm to 30 μm, still more preferably 3 μm to 25 μm, and particularly preferably 5 μm to 25 μm.

The average particle diameter of the component (C2) can be measured by the laser diffraction and scattering method. Specifically, the average particle diameter of the component (C2) is a particle diameter at a volume-based cumulative integrated value of 50% in a particle size distribution measured by the laser diffraction and scattering method (a volume-based 50% cumulative particle diameter), i.e., $D_{50}$ (a median diameter). This volume-based 50% cumulative particle diameter (D 50) is a particle diameter at a cumulative value of 50% in a cumulative curve of a particle size distribution determined on a volume basis, the cumulative curve assuming the total volume of particles to be 100%, where during accumulation the number of particles is counted from a smaller size side.

In the present invention, the component (C) is a reinforcing material the surface of which is at least partly covered with a treated layer made of a hydrophobic surface treatment agent. The treated layer preferably covers 50% or more of the surface of the reinforcing material and more preferably covers 80% or more of the surface of the reinforcing material. However, the treated layer particularly preferably covers the entire surface of the reinforcing material. Alternatively, as the component (C), use maybe made of, without impairing preferred physical properties for the component (C), a mixture of: a reinforcing material the surface of which is at least partly covered with a treated layer made of a hydrophobic surface treatment agent; and an untreated reinforcing material the surface of which is not covered with any hydrophobic surface treatment agent.

Examples of the hydrophobic surface treatment agent include silane coupling agents, titanium coupling agents, and aluminate-based coupling agents. Among them, silane coupling agents are preferred and hydrophobic alkylsilane coupling agents are more preferred.

The hydrophobic silane coupling agent may be any silane coupling agent having: an intrinsically hydrophobic functional group, such as an alkyl group or an aryl group; and a hydrolyzable functional group capable of generating a group reactable with a hydrophilic group in the surface of the reinforcing material. Typical examples of such a hydrophobic alkylsilane coupling agent include alkoxysilanes represented by the general formula (I) below.

$$R^1{}_n Si(OR^2)_{4-n} \quad \text{Formula (I)}$$

In the general formula (I), n represents an arbitrary integer selected from 1 to 3, $R^1$ represents an alkyl group, an alkenyl group or an aryl group, and these groups may have a substituent. In the presence of a plurality of $R^1$s, they may be of the same type or different types. R 2 represents an alkyl group and may have a substituent. In the presence of a plurality of Res, they may be of the same type or different types.

Examples of the alkyl group represented by $R^1$ include a heptyl group, an octyl group, a nonyl group, a decyl group, a dodecyl group, a hexadecyl group, an octadecyl group, and an icosyl group. From the viewpoint of further increasing the shock resistance of the resulting molded liquid-crystal polymer body, the number of carbon atoms of the alkyl group is preferably 8 or more, and more preferably 10 or more. The upper limit of the number of carbon atoms of the alkyl group is not particularly limited, but can be, for example, not more than 20.

These alkyl groups may have a ring structure or a branched structure. Generally, an alkyl group having a larger number of carbon atoms in the straight chain tends to have a higher degree of hydrophobicity. These alkyl groups may have one to four (preferably one to three and more preferably one) substituents to be described hereinafter at any position.

Example of the alkenyl group represented by $R^1$ include a vinyl group and a butenyl group. These alkenyl groups may have a ring structure or a branched structure. Furthermore, these alkenyl groups may have one to four (preferably one to three and more preferably one) substituents to be described hereinafter at any position.

Example of the aryl group represented by $R^1$ include a phenyl group and a naphthyl group. Furthermore, these aryl groups may have one to four (preferably one to three and more preferably one) substituents to be described hereinafter at any position.

Each of the above-listed groups represented by $R^1$ may have a substituent unless its hydrophobicity is impaired. Examples of the substituent include hydrophobic substituents, such as a fluorine atom and a (meth)acryloxy group.

Furthermore, the alkyl group represented by $R^1$ may have as the hydrophobic substituent any of the above-listed aryl groups. The aryl group represented by $R^1$ may have an alkyl group as the hydrophobic substituent.

Examples of the alkyl group represented by $R^2$ include a methyl group, an ethyl group, a propyl group, a butyl group, a pentyl group, a hexyl group, a heptyl group, an octyl group, a nonyl group, a decyl group, a dodecyl group, a hexadecyl group, an octadecyl group, and an icosyl group. Among them, because an alkoxy group ($OR^2$) in alkoxysilane represented by the general formula (I) is a hydrolyzable group, $R^2$ is, in terms of hydrolyzability, preferably a lower alkyl group with 4 or less carbon atoms, more preferably an ethyl group or a methyl group, and still more preferably a methyl group.

In the above general formula (I), n represents an arbitrary integer selected from 1 to 3. The reference character n is preferably 1 from the viewpoint of further increasing the reactivity with the particle surfaces of the reinforcing material and the hydrophobicity.

Specific examples of alkoxysilane described above include methyltrimethoxysilane, ethyltrimethoxysilane, hexyltrimethoxysilane, heptyltrimethoxysilane, octyltrimethoxysilane, nonyltrimethoxysilane, decyltrimethoxysilane, dodecyltrimethoxysilane, hexadecyltrimethoxysilane, octadecyltrimethoxysilane, icosyltrimethoxysilane, phenyltrimethoxysilane, methyltriethoxysilane, ethyltriethoxysilane, hexyltriethoxysilane, heptyltriethoxysilane, octyltriethoxysilane, nonyltriethoxysilane, decyltriethoxysilane, dodecyltriethoxysilane, hexadecyltriethoxysilane, octadecyltriethoxysilane, icosyltriethoxysilane, and phenyltriethoxysilane. These alkoxysilanes can be used singly or in combination of two or more of them.

In the present invention, the degree of hydrophobicity of the surface treatment agent can be expressed by treating the surface of a glass plate with the surface treatment agent and determining the surface free energy of the treated surface. In the present invention, the surface free energy can be determined by uniformly applying to the glass plate a surface treatment agent diluted 10 times with methanol, heating the glass plate at 85° C. for an hour, then subjecting the glass plate to a heat treatment at 110° C. for an hour, then measuring the static contact angles of two liquids, water and decane, on the glass plate surface to which the surface treatment agent is applied, and calculating the surface free energy from the static contact angles. For example, the surface free energy of decyltrimethoxysilane is 28 mN/m, the surface free energy of γ-glycidoxypropyltrimethoxysilane is 55 mN/m, and the surface free energy of 3-aminopropyltriethoxysilane is 68 mN/m.

The type of the surface treatment agent for use in the present invention is not particularly limited, but the preferred surface treatment agents are those having good thermal stability in terms of temperature during molding process of the liquid-crystal polymer, having physical and chemical stabilities, and having a surface free energy of 50 mN/m or less when a glass plate is uniformly treated with them. The lower limit of the surface free energy is not particularly limited, but is preferably 1 mN/m. Even with the use of any surface treatment agent having a surface free energy of over 50 mN/m, the surface free energy may be brought down to 50 mN/m or less by mixing two or more types of surface treatment agents.

If the surface free energy of the surface treatment agent is over 50 mN/m, it is higher than that of the liquid-crystal polymer (A), which may make it impossible to control metal ions eluted, because of failure of the reinforcing material (C) during kneading or molding process, from the failure surface and may accelerate hydrolysis of the liquid-crystal polymer (A). Therefore, the liquid-crystal polymer (A) is preferably filled with a reinforcing material (C) prepared to have a surface free energy in a range of 50 mN/m or less.

Furthermore, the oil absorption of the reinforcing material (C) after being subjected to surface treatment is preferably 130 ml/100 g or less, and more preferably 80 ml/100 g to 130 ml/100 g.

If the oil absorption is over 130 ml/100 g, the compatibility of the reinforcing material (C) with the liquid-crystal polymer (A) extremely decreases, which may cause a problem that the productivity significantly decreases and also a problem that the amount of filling of surface-treated reinforcing material (C) cannot be increased.

The oil absorption of the reinforcing material (C) after being surface-treated can be measured using the refined linseed oil method [JIS K 5101-13-1].

In relation to a method for subjecting the reinforcing material (C) to surface treatment in the present invention, there are known a dry method and a wet method as a method for previously treating the surfaces of the reinforcing material (C) with a coupling agent and both the methods can be used in the present invention. In doing so, the concentration of the surface treatment is preferably 0.1% by mass to 3.0% by mass and more preferably 0.5% by mass to 1.5% by mass relative to the reinforcing material (C).

Known surface treatment methods can be used as the method for forming a treated layer made of a surface treatment agent on the surface of the component (C). The surface treatment is performed, for example, by a dry method of loading the reinforcing material into an apparatus capable of stirring at high speed, such as a Henschel mixer, and spraying on the reinforcing material being stirred the surface treatment agent (in liquid form) or a solution obtained by dissolving the surface treatment agent in a solvent promoting hydrolysis (for example, water, an alcohol or a mixed solvent of them).

In treating the surface of the reinforcing material (C) for use in the present invention with the surface treatment agent, the amount of surface treatment agent is not particularly limited, but, in the dry method, the solution of the surface treatment agent may be sprayed so that the amount of surface treatment agent reaches, relative to 100 parts by mass of the reinforcing material (C), for example, preferably 0.1 parts by mass to 20 parts by mass, more preferably 0.1 parts by mass to 10 parts by mass, still more preferably 0.3 parts by mass to 5 parts by mass, yet still more preferably 0.5 parts by mass to 3 parts by mass, and particularly preferably 0.8 parts by mass to 1.2 parts by mass.

By defining the amount of surface treatment agent within the above ranges, the adhesion of the reinforcing material to the component (A) can be further increased.

As for the component (C) in the liquid-crystal polymer composition according to the present invention, the particle size is not particularly limited. However, when the liquid-crystal polymer composition is used as a member for a camera module, from the viewpoint of further reducing the particles and further reducing the sliding width and/or sliding depth of the sliding surface of the member, the component (C) preferably contains both the fibrous reinforcing material (C1) and the platy reinforcing material (C2) and more preferably contains both a fibrous reinforcing material (C1) having a Mohs hardness of not less than 2.5 and not more than 5 and a platy reinforcing material (C2) having a Mohs hardness of not less than 1 and less than 2.5. In this case, at least one of the respective surfaces of the fibrous reinforcing material (C1) and the platy reinforcing material (C2) is sufficient to be at least partly covered with a treated layer made of a hydrophobic surface treatment agent. From the view point of further reducing the particles of the member for a camera module and further reducing the kinetic coefficient of friction and the static coefficient of friction of the member, it is preferred that both the surfaces of the fibrous reinforcing material (C1) and the platy reinforcing material (C2) are each at least partly covered with a treated layer made of a hydrophobic surface treatment agent.

The content of the component (C) in the liquid-crystal polymer composition according to the present invention is, in a total amount of 100% by mass of the liquid-crystal polymer composition, preferably 0.1% by mass to 40% by mass, more preferably 5% by mass to 35% by mass, and still more preferably 10% by mass to 30% by mass.

By defining the content of the component (C) within the range of 0.1% by mass to 40% by mass, the production of particles when the liquid-crystal polymer composition is used as a member for a camera module can be further suppressed and the kinetic coefficient of friction and the static coefficient of friction of the member can be further reduced.

As for the component (C) in the liquid-crystal polymer composition according to the present invention, the mass ratio of the platy reinforcing material (C2) to the fibrous reinforcing material (C1), i.e., the platy reinforcing material (C2)/fibrous reinforcing material (C1) is preferably 0 to 1, more preferably 0.01 to 0.8, still more preferably 0.1 to 0.7, and particularly preferably 0.2 to 0.6. By defining the mass ratio of the platy reinforcing material (C2) to the fibrous reinforcing material (C1) within the range of 0 to 1, the production of particles can be further suppressed.

The content of the fibrous reinforcing material (C1) in the liquid-crystal polymer composition according to the present invention is, in a total amount of 100% by mass of the liquid-crystal polymer composition, preferably 0.1% by mass to 40% by mass, more preferably 5% by mass to 35% by mass, and still more preferably 10% by mass to 30% by mass.

By defining the content of the fibrous reinforcing material (C1) within the above range, the production of particles in the liquid-crystal polymer composition when used as a member for a camera module can be further suppressed, the sliding width and/or sliding depth of the sliding surface of the member can be further reduced, and the kinetic coefficient of friction and the static coefficient of friction of the member can be further reduced.

The content of the platy reinforcing material (C2) in the liquid-crystal polymer composition according to the present invention is, in a total amount of 100% by mass of the liquid-crystal polymer composition, preferably 0.1% by mass to 40% by mass, more preferably 0.5% by mass to 20% by mass, and still more preferably 2% by mass to 10% by mass.

By defining the content of the platy reinforcing material (C2) within the above range, the production of particles in the liquid-crystal polymer composition when used as a member for a camera module can be further suppressed, the sliding width and/or sliding depth of the sliding surface of the member can be further reduced, and the kinetic coefficient of friction and the static coefficient of friction of the member can be further reduced.

Barium Sulfate (D)

The liquid-crystal polymer composition according to the present invention may contain, as necessary, barium sulfate (D) (hereinafter, referred to also as a "component (D)"). Examples of the component (D) include: ground barium sulfate (barite powder) obtained by grinding a mineral called barite, deironing the ground product, and elutriating it; and precipitated barium sulfate obtained by artificial synthesis. Precipitated barium sulfate can be controlled in particle size depending on conditions during synthesis. Thus, desired fine barium sulfate particles having a small content of coarse particles can be produced. From the viewpoint of further reducing impurities and further homogenizing the particle size distribution of barium sulfate, precipitated barium sulfate is preferably used.

The component (D) is preferably in powder form and its average particle diameter is preferably 0.01 μm to 50 μm, more preferably 0.03 μm to 30 μm, still more preferably 0.05 μm to 5 μm, yet still more preferably 0.1 μinto 1.2 μm, and particularly preferably 0.2 μm to 0.8 μm. By defining the average particle diameter within the above range, the coefficient of friction during sliding can be further reduced.

The average particle diameter of the component (D) can be measured by the laser diffraction and scattering method. More specifically, the average particle diameter of the component (D) is a particle diameter at a volume-based cumulative integrated value of 50% in a particle size distribution measured by the laser diffraction and scattering method (a volume-based 50% cumulative particle diameter), i.e., $D_{50}$ (a median diameter). This volume-based 50% cumulative particle diameter ($D_{50}$) is a particle diameter at a cumulative value of 50% in a cumulative curve of a particle size distribution determined on a volume basis, the cumulative curve assuming the total volume of particles to be 100%, where during accumulation the number of particles is counted from a smaller size side.

The particle shape of the component (D) is not particularly limited so long as the component (D) is non-fibrous particles, such as spherical, prismoidal, platy, rodlike, columnar, blocky or amorphous particles, but a spherical or amorphous shape is preferred. The particle shape of barium sulfate can be analyzed, for example, by observation with a scanning electron microscope (SEM). The component (D) may be subjected to surface treatment. Examples of the treatment agent include a coating agent, a dispersant, and a modifier and specific examples include fatty acids, waxes, non-ionic surfactants, epoxy-based compounds, isocyanate-based compounds, silane-based compounds, titanate-based compounds, phosphorus-based compounds, aluminates, such as alumina, silicates, such as silicon dioxide, titanates, such as titanium dioxide. These treatment agents may be used singly or in combination of two or more of them.

The content of the component (D) in the liquid-crystal polymer composition according to the present invention is, in a total amount of 100% by mass of the liquid-crystal polymer composition, preferably 1% by mass to 30% by mass, more preferably 1% by mass to 20% by mass, still more preferably 1% by mass to 15% by mass, particularly preferably 1% by mass to 7% by mass, and most preferably 1.5% by mass to 2.5% by mass. By defining the content of the component (D) within the range of 1% by mass to 30% by mass, the production of particles can be further reduced.

Particulate Carbon Material (E)

The liquid-crystal polymer composition according to the present invention may contain, as necessary, a particulate carbon material (E) (hereinafter, referred to also as a "component (E)"). As the component (E), for example, commonly available particulate carbon materials for use for the purpose of ensuring the light-blocking properties of a molded liquid-crystal polymer body, such as a member for a camera module, and for use in coloring a resin composition can be preferably used.

Specific examples of the particulate carbon material (E) that can be used include carbon blacks, such as graphite, acetylene black, furnace black, lamp black, thermal black, channel black, roller black, and disc black; carbon nanotube; and carbon fibril. From the viewpoint of further increasing the light-blocking properties of the molded liquid-crystal polymer body molded from the liquid-crystal polymer composition according to the present invention, the particulate carbon material (E) is preferably carbon black. These types of particulate carbon materials (E) may be used singly or in combination of two or more of them.

In the present invention, the primary particle diameter of the particulate carbon material (E) is preferably not less than 10 nm and not more than 50 nm.

When the primary particle diameter of the particulate carbon material (E) is not less than 10 nm and not more than 50 nm, the particulate carbon material (E) can be easily dispersed into the liquid-crystal polymer composition in producing a liquid-crystal polymer composition according to the present invention or a molded liquid-crystal polymer body molded from the liquid-crystal polymer composition according to the present invention. In addition, the molded liquid-crystal polymer body molded from the liquid-crystal polymer composition according to the present invention can be given a sufficiently low surface resistance, which enables the increase in the amount of electric charge in the molded liquid-crystal polymer body to be further reduced. In the molded liquid-crystal polymer body obtained in the above manner, the in-plane surface resistance of the molded liquid-crystal polymer body can be easily made uniform. As a result, the increase in amount of electric charge can be reduced everywhere in the plane of the molded liquid-crystal polymer body. The primary particle diameter of the particulate carbon material (E) is preferably not less than 15 nm and not more than 45 nm, and more preferably not less than 20 nm and not more than 45 nm.

In the present invention, an arithmetic average particle diameter (number average), which is an average value of primary particle diameters measured by a transmission electron microscope, can be adopted as the primary particle diameter of the particulate carbon material (E).

In the present invention, the DBP oil absorption of the particulate carbon material (E) is preferably not less than 90 cm$^3$/100 g and not more than 550 cm$^3$/100 g.

A higher DBP oil absorption of the particulate carbon material (E) means a larger number of voids present in the vicinity of the surfaces of the particulate carbon material (E). When the number of voids in the vicinity of the surfaces of the particulate carbon material (E) is large, particles of the particulate carbon material (E) are likely to be engaged with and connected to each other in the liquid-crystal polymer composition.

When the DBP oil absorption of the particulate carbon material (E) is not less than 90 cm$^3$/100 g, the molded liquid-crystal polymer body molded from the liquid-crystal polymer composition is likely to sufficiently conduct electricity at the connected portions of the particulate carbon material (E). As a result, the surface resistance of the molded body can be more sufficiently lowered. Hence, the increase in the amount of electric charge in the molded body can be more sufficiently reduced. However, if the DBP oil absorption of the particulate carbon material (E) is excessively high, the number of voids in the vicinity of the surfaces of the particulate carbon material (E) is excessively large, which makes it likely that particles of the particulate carbon material (E) are strongly engaged with each other in the liquid-crystal polymer composition. In addition, in melt-kneading the liquid-crystal polymer (A), the fluorine-contained resin (B), the reinforcing material (C), the particulate carbon material (E), and additives to be added if desired, the melt viscosity of the mixture of them may become high. As a result, the mixture may be difficult to knead, which makes it difficult to produce the liquid-crystal polymer composition. When the DBP oil absorption of the particulate carbon material (E) is not more than 550 cm$^3$/100 g, a mixture of the liquid-crystal polymer (A), the fluorine-contained resin (B), the reinforcing material (C), the particulate carbon material (E), and additives to be added if desired can be prevented from reaching an excessively high viscosity in melt-kneading the mixture. As a result, the mixture can be easily granulated, which makes it easier to produce the liquid-crystal polymer composition according to the present invention. The DBP oil absorption of the particulate carbon material (E) is preferably not less than 90 cm$^3$/100 g, more preferably not less than 92 cm$^3$/100 g, preferably not more than 550 cm$^3$/100 g, and more preferably not more than 525 cm$^3$/100 g.

In the present invention, the value obtained by measurement in conformity with JIS K 6221 using a dibutyl phthalate absorbed meter can be adopted as the DBP oil absorption.

In the present invention, the BET specific surface area of the particulate carbon material (E) is preferably not less than 75 m$^2$/g and not more than 1500 m$^2$/g, more preferably not less than 95 m$^2$/g and not more than 1350 m$^2$/g, and still more preferably not less than 100 m$^2$/g and not more than 1300 m$^2$/g.

In the present invention, the value that can be adopted as the BET specific surface area is the value obtained by using a BET specific surface area measuring instrument to adsorb nitrogen gas thereon at the liquid nitrogen temperature and measure the amount of nitrogen gas adsorbed, and calculating, by the BET method, the BET specific surface area from the amount of nitrogen gas adsorbed. An example of the BET specific surface area measuring instrument that can be used is AccuSorb 2100E manufactured by Micromeritics Instrument Corporation.

When the BET specific surface area of the particulate carbon material (E) is the above lower limit or more, the molded liquid-crystal polymer body molded from the liquid-crystal polymer composition according to the present invention is likely to sufficiently conduct electricity at the connected portions of the particulate carbon material (E). As a result, the surface resistance of the molded liquid-crystal polymer body can be further lowered. Hence, the increase in the amount of electric charge in the molded body can be further reduced.

When, in producing the liquid-crystal polymer composition according to the present invention and its molded product, the BET specific surface area of the particulate carbon material (E) is the above upper limit or less, a mixture of the liquid-crystal polymer (A), the fluorine-contained resin (B), the reinforcing material (C), the particulate carbon material (E), and additives to be added if desired can be prevented from reaching an excessively high melt viscosity in melt-kneading the mixture. As a result, the mixture can be more easily kneaded, which makes it easier to produce the liquid-crystal polymer composition according to the present invention.

The content of the component (E) in the liquid-crystal polymer composition according to the present invention is, in a total amount of 100% by mass of the liquid-crystal polymer composition, preferably in a range of 0.1% by mass to 5.0% by mass, more preferably 1.0% by mass to 4.5% by mass, and still more preferably 2.0% by mass to 4.0% by mass. If the content of the component (E) is excessively small, the resulting liquid-crystal polymer composition may be low in jet-blackness and, therefore, may not be able to sufficiently ensure the light-blocking properties.

If the content of the component (E) is excessively large, agglomerates (agglomerated bunches of small protrusions of the particulate carbon material (E)) are suspended in a resin made of a melted, low-viscosity liquid-crystal polymer during melt-kneading, which makes the liquid-crystal polymer composition difficult to be subjected to shear during kneading and makes it likely that a dispersion failure occurs. Therefore, stress is focused on the agglomerates and the agglomerates may be the origin of fracture, which may significantly deteriorate the mechanical strength of the molded liquid-crystal polymer body and make it difficult to achieve the original purpose.

By defining the content of the component (E) in the range of 0.1% by mass to 5.0% by mass, the dispersibility thereof in the liquid-crystal polymer composition can be further increased.

Solid Lubricant

The liquid-crystal polymer composition according to the present invention may contain a solid lubricant other than PTFE (hereinafter, often referred to simply as the "solid lubricant") without impairing its preferred physical properties.

Examples of the solid lubricant include low-density polyethylene, linear low-density polyethylene, medium-density polyethylene, high-density polyethylene, ultra-high molecular weight polyethylene or other polyolefin resins, silicone resin, graphite, molybdenum disulfide, tungsten disulfide, and boron nitride. At least one of these solid lubricants may be blended into the liquid-crystal polymer composition.

The content of the solid lubricant in the liquid-crystal polymer composition according to the present invention is, in a total amount of 100% by mass of the liquid-crystal polymer composition, preferably 0.5% by mass to 10% by mass and more preferably 1% by mass to 7% by mass.

Other Additives

The liquid-crystal polymer composition according to the present invention may contain other additives without impairing its preferred physical properties. Examples of the other additives include: an inorganic filler except for the reinforcing material (C) and barium sulfate (D) (for example, calcium carbonate, mica, sericite, illite, talc, kaolinite, montmorillonite, boehmite, smectite, vermiculite, palygorskite, pyrophyllite, halloysite, diatomite, titanium dioxide); a laser direct structuring additive (for example, $MgAl_2O_4$, $ZnAl_2O_4$, $FeAl_2O_4$, $CuFe_2O_4$, $CuCr_2O_4$, $MnFe_2O_4$, $NiFe_2O_4$, $TiFe_2O_4$, $FeCr_2O_4$ or $MgCr_2O_4$); a conductive filler except for the particulate carbon material (E) (for example, metallic particles (for example, aluminum flake), metallic fibers, metal oxide particles, carbon fibers, ionic liquid or surfactant); an antistat (for example, anionic antistat, cationic antistat or non-ionic antistat); an antioxidant and a thermal stabilizer (for example, hindered phenol, hydroquinone, phosphite, thioether or substitutions of these substances); a ultraviolet ray absorber (for example, resorcinol, salicylate, benzotriazole, benzophenone or triazine); a light stabilizer (for example, hindered phenol or hindered amine); a weatherproofer; a light-resistant agent; a mold release agent (for example, higher fatty acid, higher fatty acid ester, higher fatty acid amide, metal salt of higher fatty acid (higher fatty acid used herein refers to fatty acid with 10 to 25 carbon atoms), fatty acid or metal salt of fatty acid); a lubricant; a flow modifier; a plasticizer (for example, polyester-based plasticizer, glycerin-based plasticizer, polycarboxylic acid ester-based plasticizer, phosphoric acid ester-based plasticizer, polyalkylene glycol-based plasticizer or epoxy-based plasticizer); an impact resistance improver; a flame retardant (for example, phosphazene-based compound, phosphoric acid ester, condensed phosphoric acid ester, inorganic phosphorous flame retardant, halogen-based flame retardant, silicone-based flame retardant, metal oxide-based flame retardant, metal hydroxide-based flame retardant, organometallic salt-based flame retardant, nitrogen-based flame retardant or boron compound-based flame retardant); an antidripping agent; a nucleating agent; a dispersant; a sound deadener; a neutralizer; and an antiblocking agent. The liquid crystal polymer composition may contain at least one of these additives. From the viewpoint that a molded body having more excellent adhesiveness to an adhesive, such as epoxy resin, and further reducing the production of particles can be obtained, the liquid-crystal polymer composition according to the present invention preferably contains a thermal stabilizer and/or a light stabilizer, more preferably contains, among the above-listed thermal stabilizers and light stabilizers, at least one compound selected from the group consisting of hindered phenol, hindered amine, and thioether, and still more preferably contains at least one compound selected from the group consisting of hindered phenol and hindered amine. The above compound preferably contains an amide group and/or an amino group from the viewpoint that a molded body having still more excellent adhesiveness to an adhesive, such as epoxy resin, can be obtained.

In the case where the liquid-crystal polymer composition according to the present invention contains the other additives, the content of them is not particularly limited unless it impairs the preferred physical properties of the liquid-crystal polymer composition. The content of the other additives is, in a total amount of 100% by mass of the liquid-crystal polymer composition, preferably 10% by mass or less and more preferably 5% by mass or less.

Production Method of Liquid-Crystal Polymer Composition

A liquid-crystal polymer composition according to the present invention can be produced by heating and mixing (particularly, melt-kneading) a mixture containing a liquid-crystal polymer (A), a fluorine-contained resin (B), and a reinforcing material (C) the surface of which is at least partly covered with a treated layer made of a hydrophobic surface treatment agent and further containing, as necessary, barium sulfate (D), a particulate carbon material (E), a solid lubricant, and other additives.

For melt-kneading, any known melt kneader, for example, a biaxial extruder, can be used. Specifically, the liquid-crystal polymer composition can be produced by: (1) a method of preliminarily mixing the above components with a mixer (such as a tumbler or a Henschel mixer), melt-kneading the mixture with a melt kneader, and then pelletizing it with a pelletization device (such as a pelletizer); (2) a method of controlling a master batch of desired components, mixing it with other components as necessary, and melt-kneading the mixture into pellets with a melt kneader; (3) a method of feeding the components into a melt kneader to form pellets; or other methods.

The processing temperature during melt-kneading is not particularly limited so long as it is within a temperature range in which the liquid-crystal polymer (A) can melt. Normally, the cylinder temperature of a melt kneader for use in the melt-kneading is adjusted within this range. Thus, the liquid-crystal polymer composition according to the present invention that can exhibit desired effects is produced.

Production Method and Use of Molded Liquid-Crystal Polymer Body

The liquid-crystal polymer composition according to the present invention can be produced into a molded liquid-crystal polymer body by molding it according to a known resin molding method, such as injection molding, insert molding, compression molding, blow molding or inflation molding depending on the type, use, shape, and others of a desired molded liquid-crystal polymer body. The molding method is preferably injection molding or insert molding. Alternatively, a molding method composed of any combination of the above molding methods may be adopted.

A molded liquid-crystal polymer body obtained by molding the liquid-crystal polymer composition according to the present invention can suppress the production of particles when used as a member for a camera module. In addition, the molded liquid-crystal polymer body according to the present invention can reduce the kinetic coefficient of friction and the static coefficient of friction.

The molded liquid-crystal polymer body molded using the liquid-crystal polymer composition according to the present invention is suitably used as a member for use in producing electronic components of precision equipment. The molded liquid-crystal polymer body is suitably used for production of a component including the molded liquid-crystal polymer body and examples of the component include electronic components for sliding members sliding on other members, for example, components constituting one selected from the group consisting of a connector, an antenna, a switch, a relay, and a camera module. The molded liquid-crystal polymer body according to the present invention is suitably used for production of, among the above electronic components, particularly electronic optical components (members for a camera module) being constituents of a camera module because it can be expected to prevent the reduction in optical properties due to fibrillation of the surface of the molded liquid-crystal polymer body and/or particles of members for a camera module.

Examples of electronic optical components being constituents of a camera module include a lens barrel (a portion on which a lens is mounted), a spacer, a mount holder (a portion on which the barrel is attached and which is fixed to a substrate), a base, a lens tube, a frame of a CMOS (an image sensor), a shutter, a shutter plate, a shutter body, an aperture ring, a stopper (a portion holding a lens), a fender, and a yoke.

An electrical/electronic appliance according to the present invention includes the above-described molded liquid-crystal polymer body and has a camera function. Particularly, the electrical/electronic appliance according to the present invention can be suitably used as a smartphone or a tablet terminal each having a camera function.

EXAMPLES

Hereinafter, a detailed description will be given of the present invention with reference to working examples and comparative examples, but the present invention is not at all limited to these examples. Specific raw materials used in the working examples and comparative examples are as follows.

Liquid-Crystal Polymer (A)

Liquid-crystal polymer: wholly aromatic type I, melt viscosity of 2.0×10$^4$ mPa·s (at measured temperature of 350° C.) melting point of 320° C., trade name "UENO LCP A-6000" manufactured by Ueno Fine Chemicals Industry, Ltd.

Fluorine-Contained Resin (B)

Polytetrafluoroethylene resin (PTFE): average particle diameter of 8 μm, MFR value of 50 g/10 min or more, melting point of 324° C., trade name "PTFE TF-9205" manufactured by 3M Barium Sulfate (D)

Trade name "Precipitated Barium Sulfate B-31" manufactured by Sakai Chemical Industry Co., Ltd., average particle diameter of 0.28 μm Others Untreated wollastonite fibers: average fiber length of 9.3 μm, average fiber diameter of 2.4 μm, aspect ratio of 3.9

Untreated potassium titanate fibers: average fiber length of 15 μm, average fiber diameter of 0.5 μm, aspect ratio of 30, potassium hexatitanate fibers Untreated talc: average particle diameter of 19 μm, trade name "RG319" manufactured by Fuji Talc Industrial Co., Ltd.

Particulate Carbon Material (E)

Carbon black: primary particle diameter of 24 nm, BET specific surface area of 110 m$^2$/g, DBP oil absorption of 95 cm$^3$/100 g, trade name "MA100RB" manufactured by Mitsubishi Chemical Corporation Measurement of Melt Viscosity The melt viscosity of the liquid-crystal polymer (A) was measured with a melt viscosity measurement device (trade name "Capilograph 1D" manufactured by Toyo Seiki Seisaku-sho, Ltd.) using an orifice with 1.0 mm in diameter and 10 mm in length under conditions at a temperature 30° C. higher than the melting point of the liquid-crystal polymer (A) and a shear rate of 1.0×10$^3$ sec$^{-1}$.

Average Particle Diameters of Fluorine-Contained Resin (B) and Barium Sulfate (D)

The average particle diameters were measured with a laser diffraction particle size distribution measurement device (trade name "SALD-2100" manufactured by Shimadzu Corporation).

Average Fiber Length, Average Fiber Diameter, and Aspect Ratio of Reinforcing Material (C)

Each of the average fiber length, average fiber diameter, and aspect ratio of the wollastonite fibers or potassium titanate fibers was determined from the average value of arbitrary 1000 fibers measured by observation with a scanning electron microscope (SEM).

Physical Properties of Particulate Carbon Material (E)

The primary particle diameter of carbon black was determined from an arithmetic average particle diameter (number average) which is an average value of primary particle diameters measured by a transmission electron microscope (product number "JEM2010" manufactured by JEOL Ltd.). The DBP oil absorption was measured with a dibutyl phthalate absorbed meter in conformity with JIS K 6221. The BET specific surface area was measured in conformity with JIS K 6217.

Synthetic Example 1

Untreated wollastonite fibers were loaded into a Henschel mixer and subjected to surface treatment by the dry method so that the wollastonite fibers were treated with 1.0% by mass octyltriethoxysilane relative to the untreated wollastonite fibers, thus preparing surface-treated wollastonite fibers (a fibrous reinforcing material (C1)), and the surface-treated wollastonite fibers were confirmed to have the same average fiber length, the same average fiber diameter, and the same aspect ratio as those untreated.

Synthetic Example 2

Surface-treated potassium titanate fibers (a fibrous reinforcing material (C1)) were prepared in the same manner as in Synthetic Example 1 except that the untreated wollastonite fibers were replaced with untreated potassium titanate fibers, and confirmed to have the same average fiber length, the same average fiber diameter, and the same aspect ratio as those untreated.

Synthetic Example 3

Surface-treated talc (a platy reinforcing material (C2)) was prepared in the same manner as in Synthetic Example 1 except that the untreated wollastonite fibers were replaced with untreated talc, and confirmed to have the same average particle diameter as the untreated talc.

Production of Liquid-Crystal Polymer Composition and Molded Liquid-Crystal Polymer Body Examples 1 to 13 and Comparative Examples 1 to 4

Each liquid-crystal polymer composition was melt-kneaded in the composition ratio shown in Table 1 using a biaxial extruder, thus producing pellets. The cylinder temperature of the biaxial extruder was 330° C. As the untreated wollastonite fibers, untreated potassium titanate fibers, and untreated talc in Table 1, the above-mentioned marketed products were used as they were.

The obtained pellets were molded, with an injection molder, into a flat sheet 1 (with 90 mm in height, 50 mm in width, and 3 mm in thickness) and a flat sheet 2 (with 64 mm in height, 13 mm in width, and 4 mm in thickness), thus obtaining evaluation samples (molded liquid-crystal polymer bodies). The cylinder temperature of the injection molder was 330° C. and the mold temperature thereof was 120° C.

Evaluations

Hunter Brightness

The Hunter brightness of each of the freshly molded flat sheets 1 was measured with a colorimeter (trade name: ZE 6000, manufactured by Nippon Denshoku Industries Co., Ltd.). The results are shown in Table 1.

Amount of Particles Produced

Each of the flat sheets 2 was measured in weight with a precision balance (product number "GR-200" manufactured by A&D Company, Limited), then placed in a reciprocating sliding tester (evaluation device: TK-1 manufactured by Talk System Co., Ltd.), and slid on a counter member of liquid-crystal polyester resin (having a Rockwell hardness HRM of 53) 200 reciprocations at a travel distance of 20 mm, a load of 5 N, and a velocity of 40 mm/s. After the end of sliding, particles adhering to the flat sheet 2 were removed by air and the flat sheet 2 was then measured in weight with a precision balance (product number "GR-200" manufactured by A&D Company, Limited). The difference in weight of each flat sheet 2 between before and after the test was calculated as the amount of particles produced. The results are shown in Table 1.

Sliding Width and Sliding Depth of Sliding Surface

By observing the surface of each of the flat sheets 2 after undergoing the test for the amount of particles produced with a 3D measurement microscope (product number "One-Shot VR-3100" manufactured by Keyence Corporation), the sliding width and sliding depth of the sliding surface were measured.

Coefficient of Friction

Each of the flat sheets 1 underwent a test for sliding on a hard metal with a static friction tester (product number "TRIBOSTAR TS501" manufactured by Kyowa Interface Science Co., Ltd.) under conditions of a load of 50 g, a velocity of 1 mm/sec for a travel distance of 1 mm, and the use of a stainless steel ball (SUS304 with a diameter of 3 mm) to measure the static coefficient of friction ($\mu s$) and kinetic coefficient of friction ($\mu k$) of the flat sheet 1. The results are shown in Table 1.

TABLE 1

| | | | | Unit | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|---|---|
| COMPOSITION | Liquid-crystal polymer (A) | | | % by mass | 67.1 | 65.6 | 63.1 | 60.6 | 58.1 | 65.4 | 65.1 | 70.7 | 63.1 |
| | Fluorine-contained resin (B) | | | % by mass | 1.0 | 2.5 | 5.0 | 7.5 | 10.0 | 5.0 | 5.0 | 5.0 | 5.0 |
| | Reinforcing material (C) | Fibrous reinforcing material (C1) | Surface-treated wollastonite fibers | % by mass | 20.0 | 20.0 | 20.0 | 20.0 | 20.0 | 20.0 | 20.0 | 20.0 | |
| | | | Surface-treated potassium titanate fibers | % by mass | | | | | | | | | 20.0 |
| | | Platy reinforcing material (C2) | Surface-treated talc | % by mass | 7.6 | 7.6 | 7.6 | 7.6 | 7.6 | 7.6 | 7.6 | | 7.6 |
| | Barium sulfate (D) | | | % by mass | 2.3 | 2.3 | 2.3 | 2.3 | 2.3 | | 2.3 | 2.3 | 2.3 |
| | Particulate carbon material (E) | | | % by mass | 2.0 | 2.0 | 2.0 | 2.0 | 2.0 | 2.0 | | 2.0 | 2.0 |
| | Untreated wollastonite fibers | | | % by mass | | | | | | | | | |
| | Untreated potassium titanate fibers | | | % by mass | | | | | | | | | |

TABLE 1-continued

|  |  |  | Unit | | | | | | | | | |
|---|---|---|---|---|---|---|---|---|---|---|---|---|
| | Untreated talc | | % by mass | | | | | | | | | |
| | Mass ratio (C2)/(C1) | | — | 0.38 | 0.38 | 0.38 | 0.38 | 0.38 | 0.38 | 0.38 | 0.00 | 0.38 |
| EVAL-UA-TIONS | Hunter brightness | | — | 21.7 | 23.1 | 23.0 | 23.4 | 23.6 | 21.6 | 81.5 | 20.7 | 23.5 |
| | Amount of particles produced | | ppm | 0 | 0 | 0 | 0 | 0 | 0 | 0 | 38 | 0 |
| | Sliding width of sliding surface | | μm | 691 | 645 | 611 | 612 | 637 | 699 | 606 | 707 | 603 |
| | Sliding depth of sliding surface | | μm | 3 | 4 | 5 | 4 | 5 | 3 | 4 | 9 | 4 |
| | Static coefficient of friction (μs) | | — | 0.117 | 0.117 | 0.113 | 0.107 | 0.098 | 0.117 | 0.107 | 0.106 | 0.104 |
| | Kinetic coefficient of friction (μk) | | — | 0.102 | 0.096 | 0.093 | 0.084 | 0.084 | 0.082 | 0.087 | 0.075 | 0.085 |

|  |  |  |  | Unit | Ex. 10 | Ex. 11 | Ex. 12 | Ex. 13 | Comp. Ex. 1 | Comp. Ex. 2 | Comp. Ex. 3 | Comp. Ex. 4 |
|---|---|---|---|---|---|---|---|---|---|---|---|---|
| COMPOSITION | Liquid-crystal polymer (A) | | | % by mass | 65.4 | 65.1 | 63.1 | 63.1 | 68.1 | 70.4 | 63.1 | 63.1 |
| | Fluorine-contained resin (B) | | | % by mass | 5.0 | 5.0 | 5.0 | 5.0 | | | 5.0 | 5.0 |
| | Reinforcing material (C) | Fibrous reinforcing material (C1) | Surface-treated wollastonite fibers | % by mass | | | 27.6 | | 20.0 | 20.0 | | |
| | | | Surface-treated potassium titanate fibers | % by mass | 20.0 | 20.0 | | | | | | |
| | | Platy reinforcing material (C2) | Surface-treated talc | % by mass | 7.6 | 7.6 | | 7.6 | 7.6 | 7.6 | | |
| | Barium sulfate (D) | | | % by mass | | 2.3 | 2.3 | 2.3 | 2.3 | | 2.3 | 2.3 |
| | Particulate carbon material (E) | | | % by mass | 2.0 | | 2.0 | 2.0 | 2.0 | 2.0 | 2.0 | 2.0 |
| | Untreated wollastonite fibers | | | % by mass | | | | 20.0 | | | 20.0 | |
| | Untreated potassium titanate fibers | | | % by mass | | | | | | | | 20.0 |
| | Untreated talc | | | % by mass | | | | | | | 7.6 | 7.6 |
| EVAL-UA-TIONS | Mass ratio (C2)/(C1) | | | — | 0.38 | 0.38 | 0.00 | — | 0.38 | 0.38 | — | — |
| | Hunter brightness | | | — | 23.4 | 82.1 | 19.1 | 21.2 | 23.1 | 20.6 | 20.8 | 25.5 |
| | Amount of particles produced | | | ppm | 0 | 0 | 18 | 0 | 263 | 912 | 0 | 0 |
| | Sliding width of sliding surface | | | μm | 665 | 650 | 690 | 711 | 2752 | 3137 | 673 | 651 |
| | Sliding depth of sliding surface | | | μm | 8 | 6 | 7 | 7 | 141 | 90 | 5 | 4 |
| | Static coefficient of friction (μs) | | | — | 0.119 | 0.115 | 0.123 | 0.137 | 0.151 | 0.145 | 0.186 | 0.193 |
| | Kinetic coefficient of friction (μk) | | | — | 0.093 | 0.090 | 0.097 | 0.104 | 0.108 | 0.095 | 0.130 | 0.141 |

As is obvious from Table 1, it can be seen that Examples 1 to 13 using a liquid-crystal polymer composition which contains the liquid-crystal polymer (A), the fluorine-contained resin (B), and the reinforcing material (C) and in which the surface of the reinforcing material (C) is at least partly covered with a treated layer made of a hydrophobic surface treatment agent can suppress the production of particles, and, in addition, the respective molded liquid-crystal polymer bodies obtained in these examples can reduce the kinetic coefficient of friction and static coefficient of friction.

It can be seen that since the molded liquid-crystal polymer body obtained in Example 1 is molded with the use of the fluorine-contained resin (B) (polytetrafluoroethylene resin), the molded liquid-crystal polymer body can be reduced in the amount of particles produced, the sliding width and/or sliding depth of the sliding surface, and the coefficients of friction and, particularly, can be significantly reduced in the amount of particles produced, as compared to the molded liquid-crystal polymer body molded without the use of fluorine-contained resin (B) as in Comparative Example 1.

It can also be seen that since the molded liquid-crystal polymer bodies obtained in Examples 3 and 9 are molded with the use of not only the fluorine-contained resin (B) but also barium sulfate (D), particularly, the sliding width of the sliding surface can be further reduced as compared to the molded liquid-crystal polymer bodies molded without the use of barium sulfate (D) as in Examples 6 and 10.

The Hunter brightness of the molded liquid-crystal polymer body in Example 3 containing the particulate carbon material (E) was 23.0, whereas the Hunter brightness of the molded liquid-crystal polymer body in Example 7 containing no particulate carbon material (E) was as high as 81.5. Furthermore, comparison between Example 9 using surface-treated potassium titanate fibers and Example 11 showed similar results. This shows that the addition of a particulate carbon material causes the Hunter brightness to be lowered and thus causes the light-blocking properties to be improved.

It can also be seen that since the molded liquid-crystal polymer body obtained in Example 3 is molded with the use of not only the fluorine-contained resin (B) and barium sulfate (D) but also a combination of the fibrous reinforcing material (C1) (wollastonite fibers) the surface of which is at least partly covered with a treated layer made of a hydrophobic surface treatment agent and the platy reinforcing material (C2), the molded liquid-crystal polymer body can be reduced in the amount of particles produced and can be further reduced in the sliding width and/or sliding depth of the sliding surface, as compared to the molded liquid-crystal polymer bodies molded with the use of only the fibrous reinforcing material (C1) (wollastonite fibers) as the reinforcing material as in Examples 8 and 12.

It can also be seen that since, in the molded liquid-crystal polymer body obtained in Example 3, both the respective surfaces of the fibrous reinforcing material (C1) (wollastonite fibers) and the platy reinforcing material (C2) (talc) are each covered with a treated layer made of a hydrophobic surface treatment agent, the molded liquid-crystal polymer body obtained in Example 3 can be further reduced in coefficients of friction (particularly, static coefficient of friction) as compared to Example 13 in which only the surface of the platy reinforcing material (C2) (talc) is covered with a treated layer made of a hydrophobic surface treatment agent. It can also be seen that even Example 13 in which only the surface of the platy reinforcing material (C2) (talc) is covered with a treated layer made of a hydrophobic surface treatment agent can be sufficiently reduced in coefficient of friction as compared to Comparative Example 3 in which both the respective surfaces of the fibrous reinforcing material (C1) (wollastonite fibers) and the platy reinforcing material (C2) (talc) are not covered with a treated layer made of a hydrophobic surface treatment agent.

From the description thus far given, it can be seen that when a liquid-crystal polymer composition containing a liquid-crystal polymer (A), a fluorine-contained resin (B), a reinforcing material (C) the surface of which is at least partly covered with a treated layer made of a hydrophobic surface treatment agent, and further containing, as necessary, barium sulfate (D) and a particulate carbon material (E) is molded, the light-blocking properties, the amount of particles produced, the sliding width and/or sliding depth of the sliding surface, and the kinetic and static coefficients of friction can be reduced and, particularly, an unexpected effect of drastically increasing the effect of suppressing the production of particles can be obtained.

Therefore, the molded liquid-crystal polymer body using the liquid-crystal polymer composition according to the present invention can be suitably used in, for example, electronic optical components being constituents of a camera module.

The invention claimed is:

1. A liquid-crystal polymer composition comprising a liquid-crystal polymer (A), a fluorine-contained resin (B), and a reinforcing material (C), wherein a surface of the reinforcing material (C) comprises a hydrophobic surface treatment agent, and the hydrophobic surface treatment agent is alkoxysilane represented by a general formula (I) below:

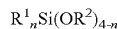 Formula (I)

wherein in the general formula (I) n represents an arbitrary integer selected from 1 to 3, $R^1$ represents an alkyl group, an alkenyl group or an aryl group, and $R^2$ represents an alkyl group.

2. The liquid-crystal polymer composition according to claim 1, wherein the fluorine-contained resin (B) has an average particle diameter of 0.1 μm to 100 μm.

3. The liquid-crystal polymer composition according to claim 1, wherein a content of the fluorine-contained resin (B) is 0.1% by mass to 30% by mass in a total amount of 100% by mass of the liquid-crystal polymer composition.

4. The liquid-crystal polymer composition according to claim 1, wherein a content of the reinforcing material (C) is 0.1% by mass to 40% by mass in a total amount of 100% by mass of the liquid-crystal polymer composition.

5. The liquid-crystal polymer composition according to claim 1, wherein the reinforcing material (C) contains at least one of a fibrous reinforcing material (C1) and a platy reinforcing material (C2).

6. The liquid-crystal polymer composition according to claim 5, wherein the fibrous reinforcing material (C1) has an average fiber length of 1 μm to 300 μm.

7. The liquid-crystal polymer composition according to claim 5, wherein the fibrous reinforcing material (C1) has a Mohs hardness of not less than 2.5 and not more than 5.

8. The liquid-crystal polymer composition according to claim 5, wherein the platy reinforcing material (C2) has a Mohs hardness of not less than 1 and less than 2.5.

9. The liquid-crystal polymer composition according to claim 5, wherein a mass ratio of the platy reinforcing material (C2) to the fibrous reinforcing material (C1) (platy reinforcing material (C2)/fibrous reinforcing material (C1)) is 0 to 1.

10. The liquid-crystal polymer composition according to claim 5, wherein the reinforcing material (C) contains both the fibrous reinforcing material (C1) and the platy reinforcing material (C2).

11. The liquid-crystal polymer composition according to claim 10, wherein respective surfaces of the fibrous reinforcing material (C1) and the platy reinforcing material (C2) are each at least partly covered with a treated layer made of a hydrophobic surface treatment agent.

12. The liquid-crystal polymer composition according to claim 1, wherein the liquid-crystal polymer (A) is a wholly aromatic liquid-crystal polymer.

13. The liquid-crystal polymer composition according to claim 1, being used in a camera module.

14. A molded liquid-crystal polymer body being a molded body of the liquid-crystal polymer composition according to claim 1.

15. The molded liquid-crystal polymer body according to claim 14, being a member for a camera module.

16. An electrical/electronic appliance having a camera function, the electrical/electronic appliance comprising the molded liquid-crystal polymer body according to claim 14.

* * * * *